US007065537B2

(12) United States Patent
Cha et al.

(10) Patent No.: US 7,065,537 B2
(45) Date of Patent: Jun. 20, 2006

(54) METHOD AND SYSTEM FOR HIGHLY-PARALLEL LOGGING AND RECOVERY OPERATION IN MAIN-MEMORY TRANSACTION PROCESSING SYSTEMS

(75) Inventors: Sang Kyun Cha, Seoul (KR); Ju Chang Lee, Kyonggi-do (KR); Ki Hong Kim, Seoul (KR)

(73) Assignee: Transact In Memory, Inc., Seoul (KR)

( * ) Notice: Subject to any disclaimer, the term of this patent is extended or adjusted under 35 U.S.C. 154(b) by 0 days.

(21) Appl. No.: 09/768,301

(22) Filed: Jan. 25, 2001

(65) Prior Publication Data

US 2002/0116404 A1    Aug. 22, 2002

(30) Foreign Application Priority Data

Jun. 7, 2000   (KR)   ................. 2000-31166

(51) Int. Cl.
   *G06F 17/30*   (2006.01)
(52) U.S. Cl. .................. 707/202; 707/200; 707/204
(58) Field of Classification Search ............. 707/202, 707/203, 204, 205, 206, 201, 200
   See application file for complete search history.

(56) References Cited

U.S. PATENT DOCUMENTS

| | | | | |
|---|---|---|---|---|
| 5,193,162 A | * | 3/1993 | Bordsen et al. ............. | 711/152 |
| 5,375,128 A | * | 12/1994 | Menon et al. ............... | 714/770 |
| 5,696,967 A | | 12/1997 | Hayashi et al. ............. | 395/618 |
| 5,751,939 A | * | 5/1998 | Stiffler ........................ | 714/15 |
| 6,185,577 B1 | * | 2/2001 | Nainani et al. ............. | 707/202 |
| 6,269,381 B1 | * | 7/2001 | St. Pierre et al. ........... | 707/202 |
| 6,327,671 B1 | * | 12/2001 | Menon ........................ | 707/200 |
| 6,449,623 B1 | * | 9/2002 | Bohannon et al. .......... | 707/202 |
| 6,513,093 B1 | * | 1/2003 | Chen et al. ................... | 711/4 |
| 6,618,822 B1 | * | 9/2003 | Loaiza et al. ................ | 714/20 |

OTHER PUBLICATIONS

Hac et al. A new cell loss recovery method using forward error correction in ATM networks, Internation Journal of Network Managment, vol. 8, Mar.-Apr. 1998, p. 87-103.*
Blaum et al. EVENODD: an optimal scheme for tolerating double disk failure in RAID architectures, International Conference on Computer Architecture, 1994, p. 245-254.*

* cited by examiner

*Primary Examiner*—Jean M. Corrielus
*Assistant Examiner*—Baoquoc N. To
(74) *Attorney, Agent, or Firm*—Fleshner & Kim, LLP

(57) ABSTRACT

An efficient logging method and system is disclosed that can be used to recover from a failure in a transaction system. It is based on a differential logging scheme that allows commutative and associative recovery operations. The method includes the steps of taking a before-image of the primary database in main memory before an update to the primary database; taking an after-image of the primary database after the update; generating a differential log by applying bit-wise exclusive-OR (XOR) between the before-image and the after-image; and performing either a redo or undo operation by applying XOR between said one or more logs and the before-image. Since XOR operations are commutative and associative, correct recovery is possible regardless of the creation sequence of log records. The present invention improves the performance of a logging system by reducing the size of log records and by allowing parallel execution of recovery operations.

37 Claims, 19 Drawing Sheets

| LSN | TID | ... | Size | Body |
|-----|-----|-----|------|------|
| C1  | T1  | ... | 4    | 0,7  |
| C2  | T2  | ... | 4    | 7,6  |
| C3  | T3  | ... | 4    | 6,14 |

| LSN | TID | ... | Size | Body |
|-----|-----|-----|------|------|
| D1  | T1  | ... | 4    | 0111 |
| D2  | T2  | ... | 4    | 0001 |
| D3  | T3  | ... | 4    | 1000 |

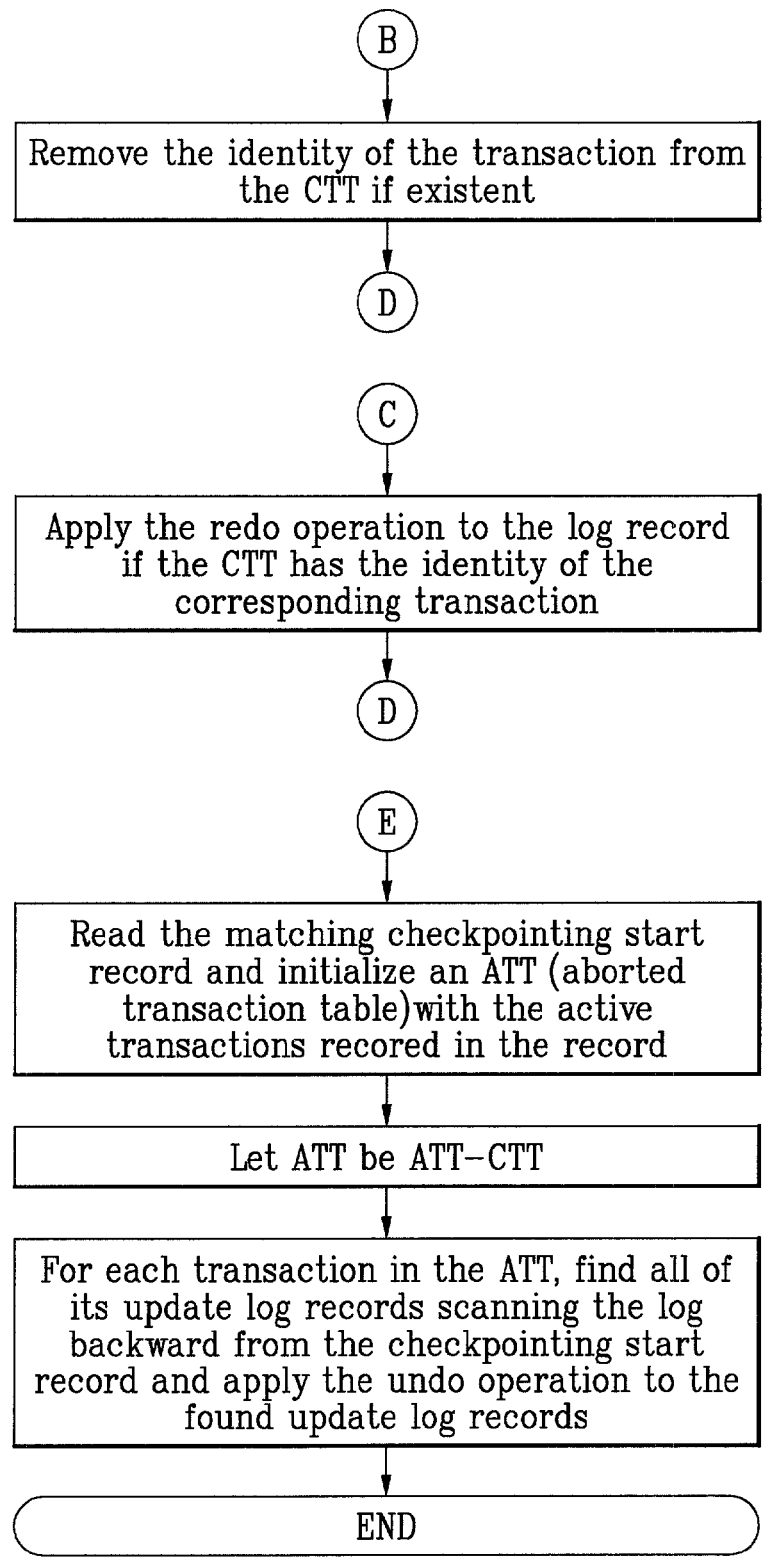

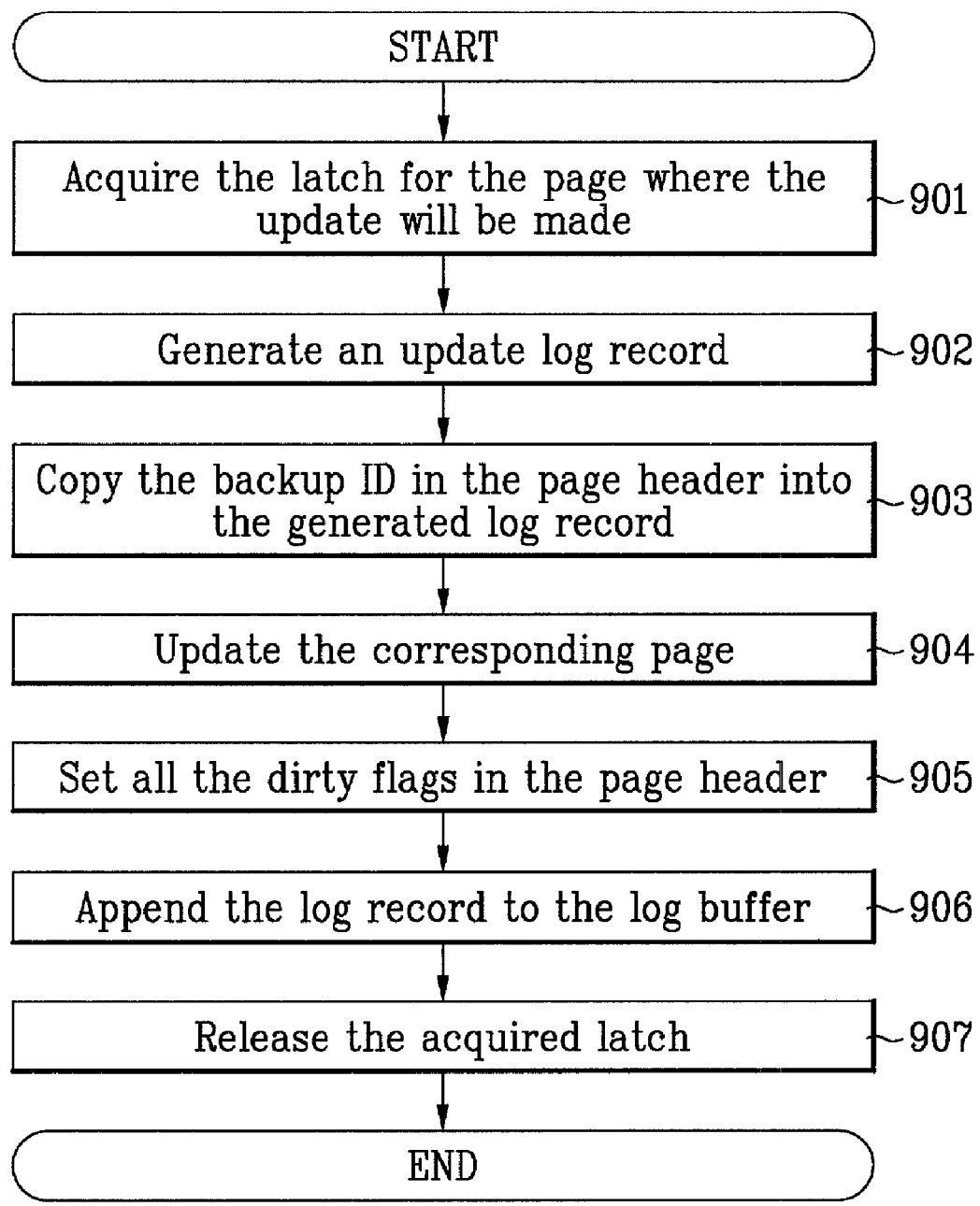

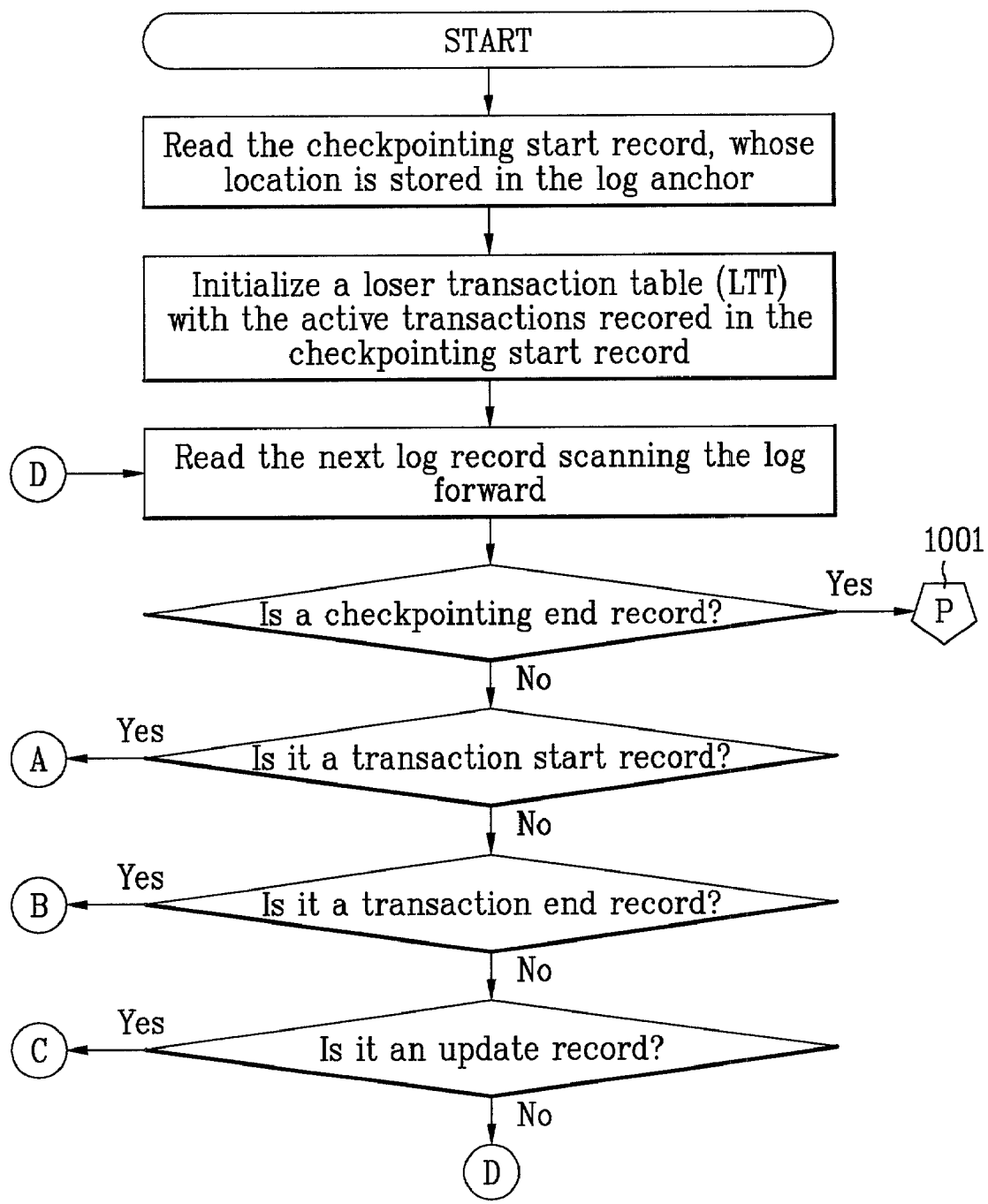

BL: Backup Loader
BR: Backup Read
BP: Backup Play
LL: Log Loader
LR: Log Read
LP: Log Play

# METHOD AND SYSTEM FOR HIGHLY-PARALLEL LOGGING AND RECOVERY OPERATION IN MAIN-MEMORY TRANSACTION PROCESSING SYSTEMS

BACKGROUND OF THE INVENTION

1. Technical Field

This invention relates to main-memory transaction processing systems. More specifically, the present invention relates to a logging method and system for recovery of a main-memory database in a transaction processing system.

2. Description of Related Art

A transaction processing system must process transactions in such a manner that "consistency" and "durability" of data are maintained even in the event of a failure such as a system crash. Consistency of data is preserved when transactions are performed in an atomic and consistent manner so that the data initially in a consistent state is transformed into another consistent state. Durability of data is preserved when changes made to the data by "committed" transactions (transactions completed successfully) survive system failures. A database often refers to the data on which transactions are performed.

To achieve consistency and durability of a database, most transaction processing systems perform a process called logging, the process of recording updates in terms of log records in a log file. In case of a failure, these log records are used to undo the changes by incomplete transactions, thereby recovering the database into a consistent state before the failure. These log records are also used to redo the changes made by the committed transactions, thereby maintaining the durable database.

Recovering a consistent and durable database after a system crash using only the log records would require a huge volume of log data because all the log records that have been generated since the creation of the database must be saved. Therefore, the process called "checkpointing" is often used where the database is copied to a disk in a regular interval so that only the log records created since the last checkpointing need to be stored. In practice, each page in the database has a "dirty flag" indicating any modification by a transaction so that only the pages modified since the last checkpointing are copied to a disk.

FIG. 1 shows a conventional recovery architecture of a main-memory database management system (DBMS), where two backups (101 and 102) are maintained with a log (103). A single checkpointing process updates only one of the backups, and successive checkpointing processes alternate between them. To coordinate the alternation, each in-memory database page has two dirty flags. When a transaction modifies a page, it sets both flags indicating modification by the transaction. When a checkpointing process flushes the page to the first backup, the first flag is reset to indicate that no further checkpointing needs be done to the first backup. Similarly, when a successive checkpointing process flushes the page to the second backup, the second flag is reset.

FIG. 2 shows a conventional restart process using a backup of the database and the log in main-memory DBMSs. The restart process comprises the following four steps. First, the most recent backup is read into main memory (BR for "backup read") (201). Second, the database is restored to the one as existed at the time the backup was made (BP for "backup play") (202). Third, the log records are read into main memory (LR for "log read") (203). Fourth, the database is restored to the one of the most recent consistent state using the log records (LP for "log play") (204).

FIGS. 3a and 3b are flow charts of the conventional two-pass log-play process. To restore the database to the one of the most recent consistent state, the log records generated by all the committed transactions need to be played, but the log records generated by so-called "loser transactions" that were active at the time of system crash have to be skipped (A transaction is said to be a loser when there is a matching transaction start log record but no transaction end record). For this purpose, all the log records encountered scanning the log from the checkpointing start log record to the end of the log are played (307). Then, the changes by the log records of the loser transactions are rolled back (308).

To identify loser transactions, a loser transaction table (LTT) is maintained, which has two fields, TID and Last LSN. This table is initialized with the active transactions recorded in the checkpointing start log record (301). When encountering a transaction start record (302), a matching entry is created in the LTT (305). When encountering a transaction end (either commit or abort) record (303), the matching entry is removed from the LTT (306). Otherwise (304), the LSN of the current log record is recorded in the Last LSN field of the matching LTT entry (307). When reaching the end of the log, the transactions that have matching entries still in the LTT are losers. The most recent record of a loser transaction can be located using the Last LSN field of the matching LTT entry, and other records of the transaction can be located by chasing the Last LSN field of accessed log records backward.

When using the physical logging method of the conventional art, log records must be applied in the order of log-record creation during the LP process. That is, logs created earlier must be used first to redo some of the updates. The conventional logging method imposes the sequential ordering because the undo and redo operations are not commutative and associative. This sequential ordering requirement imposes a lot of constraints in the system design.

In a main-memory DBMS, for example, where the entire database is kept in main memory, disk access for logging acts as a bottleneck in the system performance. In order to reduce such a bottleneck, employment of multiple persistent log storage devices may be conceived to distribute the processing. The use of multiple persistent log storage devices, however, is not easily amenable to the conventional logging method because there is necessarily an overhead of merging log records in the order of creation during the step of LP.

Therefore, there is a need for an efficient logging system that may comport with massive parallel operations in distributed processing.

OBJECTS AND SUMMARY OF THE INVENTION

It is an object of the present invention to provide an efficient logging scheme that can be used to recover a transaction processing system after a failure occurs.

It is another object of the present invention to provide a logging scheme where parallel operations are possible.

The foregoing objects and other objects are achieved in the present invention using a differential logging method that allows commutative and associative recovery operations. The method includes the steps of taking a before-image of database in main memory before an update to the database; taking an after-image of the database after the update; generating a log by applying bit-wise exclusive-OR (XOR) between the before-image and the after-image; and performing either a redo or undo operation by applying XOR between said one or more logs and the database.

BRIEF DESCRIPTION OF THE DRAWINGS

FIGS. 7a and 7b flow charts of a one-pass log-play process used in the present invention to recover the database from a backup made with a consistent checkpointing scheme.

FIG. 9 is a flow chart of an update process used in the present invention in combination with the fuzzy checkpointing process.

FIGS. 10a and 10b are flow charts of a modified two-pass log-play process used in the present invention to recover the database from a backup made by the fuzzy checkpointing process.

DETAILED DESCRIPTION OF THE INVENTION

Figure 1:
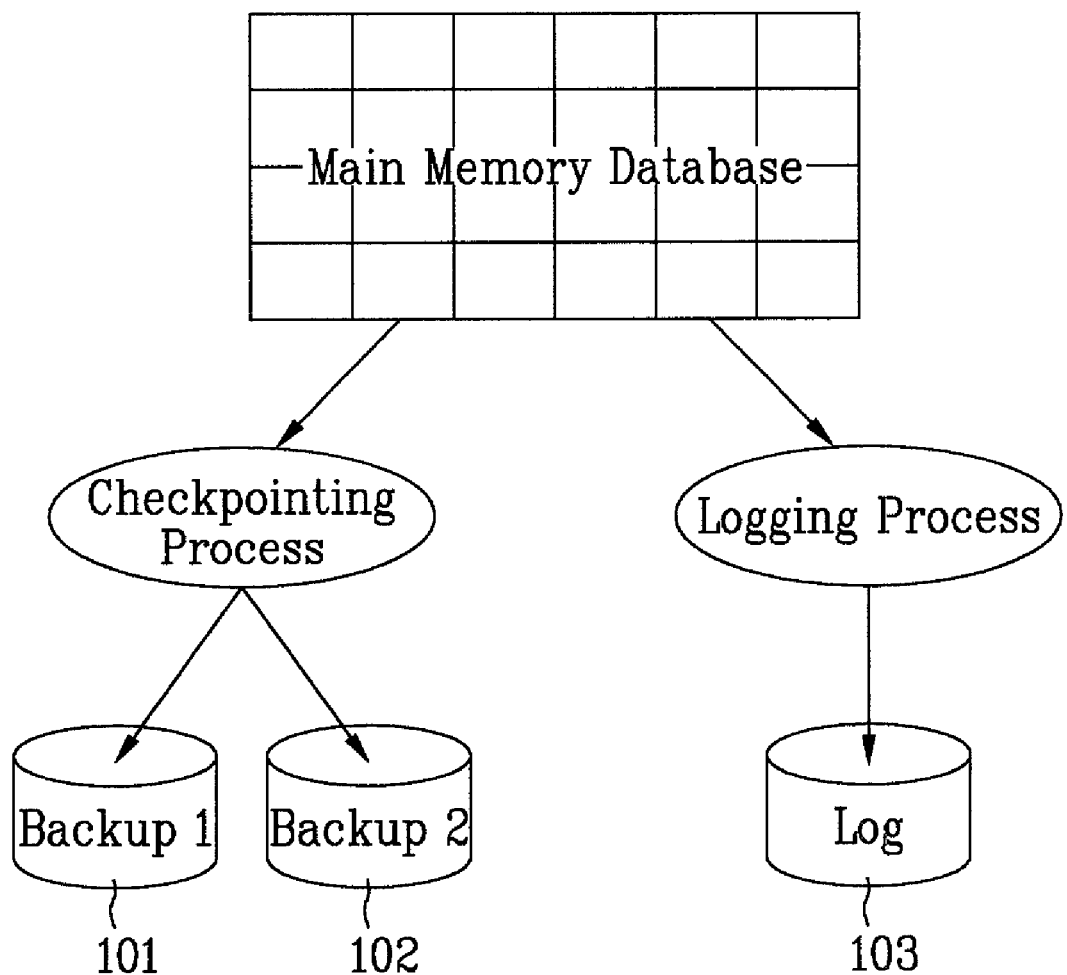
FIG. 1 is a system diagram of conventional recovery architecture of a main-memory database management system storing the database entirely in main memory.

An aspect of the present invention is based on generating differential log records using the bit-wise exclusive-OR (XOR) operations, and applying the differential log records in an arbitrary order to roll forward for the redo operation and roll back for the undo operation. That the execution order is independent from the order of log record creation is based on the following mathematical observations.

Definition of the Differential Log Record

If an update operation using transaction changes the value $b_{t-1}$ of a slot (the slot denotes a part of the database; it can be a field, a record, or any other database object) to $b_t$, then the corresponding differential log record $\Delta_t$ is defined as $b_t \oplus b_{t-1}$, where $b_t$ is the slot after the t-th update occurs, $\oplus$ denotes the bit-wise XOR operation, and $b_{t-1}$ is the slot before the t-th update occurs.

Theorem 1: Recoverability (for Redo and Undo) Using Differential Log Records

Assume that the value of a slot has changed from $b_0$ to $b_m$ by m number of updates, and each update $u_t$ (t=1, ..., m) has generated the differential log record $\Delta_t$. Then, the final value $b_m$ can be recovered (for the redo operation) from using the initial value $b_0$ and the differential log records. In the same way, the initial value $b_0$ can be recovered (for the undo operation) from using the final value $b_m$ and the differential log records.

(Proof)

XOR operations are commutative and associative. For any binary numbers, p, q, and r, $p \oplus q = q \oplus p$ (Commutativity)

$(p \oplus q) \oplus r = p \oplus (q \oplus r)$ (Associativity)

Therefore, i) Recovery of $b_m$ from $b_0$:

$b_0 \oplus \Delta_1 \oplus \Delta_2 \oplus \ldots \oplus \Delta_m = b_0 \oplus (b_0 \oplus b_1) \oplus (b_1 \oplus b_2) \oplus \ldots \oplus (b_{m-1} \oplus b_m) = (b_0 \oplus b_0) \oplus (b_1 \oplus b_1) \oplus \ldots \oplus b_m = 0 \oplus \ldots \oplus 0 \oplus b_m = b_m$ ii) Recovery of $b_0$ from $b_m$:

$b_m \oplus \Delta_m \oplus \Delta_{m-1} \oplus \ldots \oplus \Delta_1 = b_m \oplus (b_{m-1} \oplus b_m) \oplus \ldots \oplus (b_0 \oplus b_1) = b_m \oplus (b_m \oplus b_{m-1}) \oplus \ldots \oplus (b_1 \oplus b_0) = (b_m \oplus b_m) \oplus (b_{m-1} \oplus b_{m-1}) \oplus \ldots \oplus b_0 = 0 \oplus \ldots \oplus 0 \oplus b_0 = b_0$ Theorem 2: Order-independence of Redo and Undo Operations For redo operations, given the initial value $b_0$ of a slot and differential log records $\Delta_t$, where t=1, ..., m, the final value $b_m$ can be recovered (for the redo operation) from applying the differential log records in an arbitrary order. In the same way, the initial value $b_0$ can be recovered (for the undo operation) from applying the differential log records in an arbitrary order.

(Proof)

Assume that differential log records are applied in the order of $\Delta_{(1)}, \Delta_{(2)}, \ldots, \Delta_{(m)}$ where $\Delta_{(t)}$ is selected in an arbitrary order from the set of sequentially-generated differential log records $\{\Delta_1, \ldots, \Delta_{m-1}, \Delta_m\}$.

Then, the final value of the slot is $b_0 \oplus \Delta_{(1)} \oplus \Delta_{(2)} \oplus \ldots \oplus \Delta_{(m)}$ Since $\oplus$ is commutative the order of applying $\Delta_{(k)}$ can be changed into the following sequence.

$b_0 \oplus \Delta_1 \oplus \Delta_2 \oplus \ldots \oplus \Delta_m$

This completes the proof for the redo operation.

The same proof applies to the undo operations.

Theorem 3: Order-independence Between Redo and Undo Operations

Assume that there are n differential log records to be redone, whose redo operations are denoted by $R_i$ (i=1, ..., n), and m differential log records to be undone, whose undo operations are denoted by $U_j$ (j=1, ..., m). Then, all the following execution sequences result in the same state of the database.

Sequence 1. (undo phase after redo phase) $R_1, R_2, \ldots R_n, U_1, U_2, \ldots, U_m$ Sequence 2. (redo phase after undo phase) $U_1, U_2, \ldots, U_m, R_1, R_2, \ldots, R_n$ Sequence 3. (redo and undo in a single phase) any permutation of $\{R_1, R_2, \ldots R_n, U_1, U_2, \ldots, U_m\}$ (for example, $R_1, U_1, R_2, R_3, U_2, \ldots, R_n, \ldots, U_m$)

(Proof)

The theorem results from the commutative and associative properties of XOR operations involved in the redo and undo operations.

Figure 4:
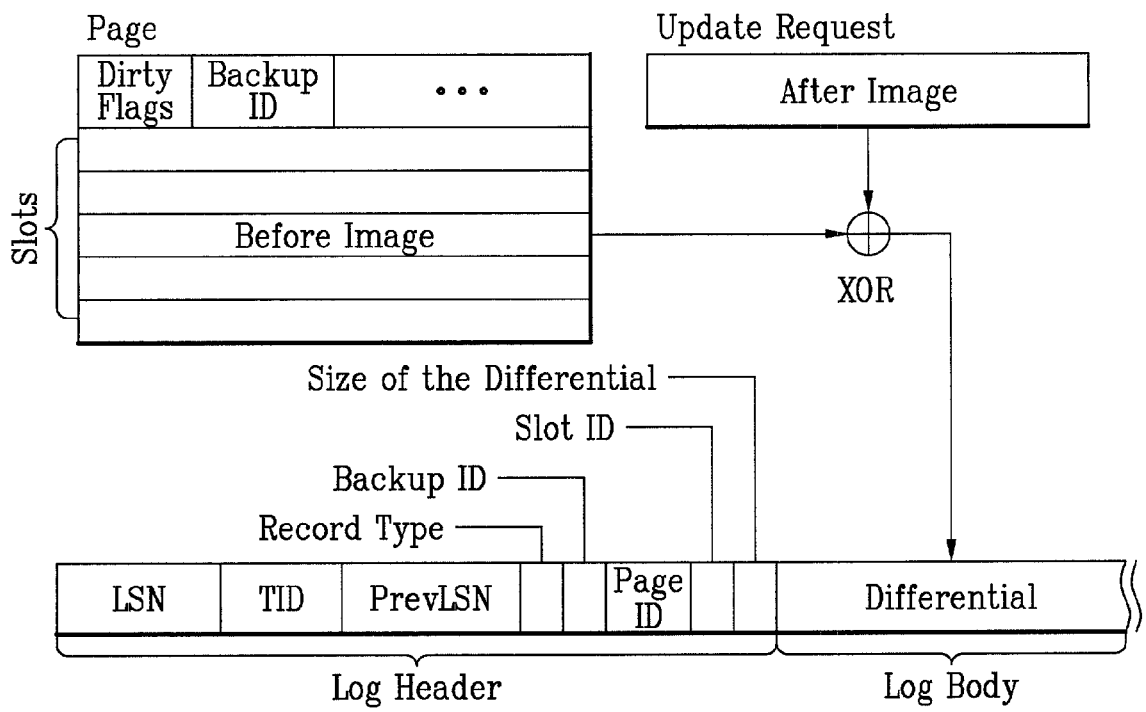
FIG. 4 is a diagram of the structure of update log records used in the present invention to capture changes in the database.

FIG. 4 shows the structure of update log records and database pages used in the present invention. A storage structure is assumed where a database consists of multiple pages of a fixed size, with each page having many slots. A different storage structure may need a modification, but such modification should be apparent to those skilled in the art. A preferred embodiment of the present invention uses at least five types of log records: transaction start, transaction end, update, checkpointing start, and checkpointing end. The first two are used to record the beginning and the end of a transaction while the last two are used to record the beginning and the end of a checkpointing process.

An update log record is used to store changes in the database comprises of a log header and a log body. FIG. 4 shows a variety of fields in the log header according to a preferred embodiment. The "LSN (Log Sequence Number)" field stores the identity of the current log record by preferably storing the physical address of log record on disk. The "TID (Transaction ID)" field stores the identity of the transaction associated with the current log record. The "PrevLSN" field stores the identity of the log record that was most recently created by the same transaction so that the information can be conveniently used to chain the log records of a transaction for fast backward retrieval. The "Type" field stores the type of log record. The "Backup ID" field stores the relation between the log record and the changed page. This field needs to be maintained only when using a fuzzy checkpointing scheme, which will be explained later in FIGS. 8a and 8b. The "Page ID" field stores the identity of a page where the update occurred. The "Offset" field stores the identity of a slot inside a page where the update occurred. The "Size" field stores the length of the updated slot.

The body of a log record stores the differential log information. Specifically, it stores the bit-wise exclusive-OR (XOR) result of the data image of the database before update ("before image") and the data image of the database after update ("after image"). This differential logging scheme storing only the differentials is distinguished from the conventional physical logging scheme where both the before image and the after image are stored. For example, if the before image is "0011" and the after image is "0101", the present invention stores only differential, namely, the XOR result of "0110".

Figure 5:
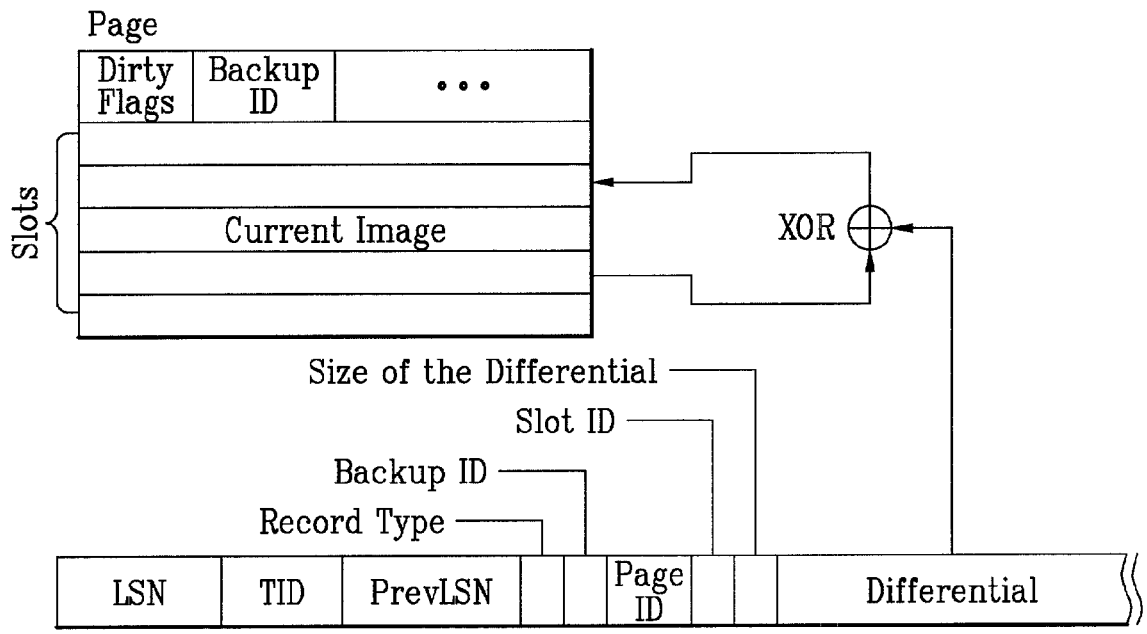
FIG. 5 is a diagram illustrating the redo and undo operations applied to update log records of the present invention during a restart process.

FIG. 5 illustrates the redo and undo operations applied to the update log records of the present invention during a restart process. First, the log header is consulted to find the location in the database, associated with the current log record. In a preferred embodiment, the location is determined from the "Page ID" and "Slot ID" information found in the log header. The redo or undo operation is performed by applying bit-wise XOR between the data found in the location and the log body of the current log record and writing the XOR result into the location. Unlike the conventional physical logging scheme, there is no difference between the redo operation and the undo operation in the present invention.

FIGS. 6a to 6e shows a comparison between the differential logging scheme of the present invention and the physical logging scheme of the conventional art. Since the operations in the conventional physical logging scheme are not commutative and associative, the redo operations, for example, must be performed in the sequential order of log record creation.

Figures 6A, 6B, 6C:
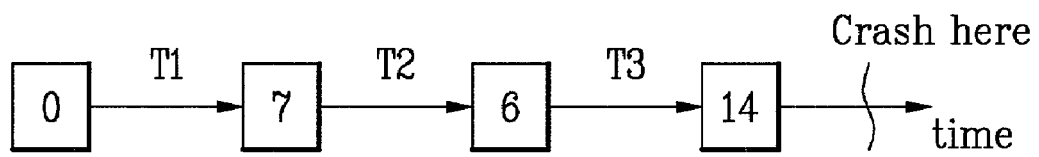
FIGS. 6a to 6e are an illustration comparing the differential logging scheme of the present invention with the physical logging scheme of the conventional art.

Consider a situation where a system crash occurs after processing three transactions, T1, T2, and T3, as in FIG. 6a. Suppose these transactions change the four-byte integer in a slot of the database in the order of 0, 7, 6 and 14. FIGS. 6b and 6c show a sequence of log records created as the slot image changes when the conventional logging scheme and the differential logging scheme are used, respectively. Whereas the body fields of the conventional log records contain both the before and after image, those of differential log records contain only the difference between the before and the after image.

Figure 6D:

Upon the system crash, if redo operations were applied in the same sequence as the original sequence, a correct recovery would result for both logging schemes. FIG. 6d shows that both logging schemes recover the correct value of 14 by applying redo operations in the order of log record creation. Note that the redo operation of the conventional logging scheme copies the after image into the corresponding slot of the database.

Figure 6E:
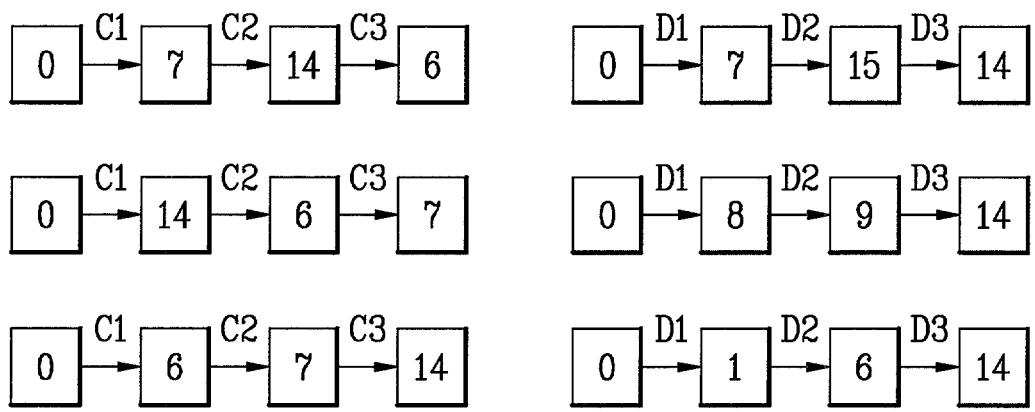

However, if redo operations were done in a different sequence from the original sequence, a correct recovery would not be possible in the conventional logging scheme. In contrast, the differential logging scheme of the present invention enables an accurate reconstruction regardless of the order of applying the log records. FIG. 6e shows the consequence of different orders of applying the redo operations. With the differential logging scheme, a correct recovery results regardless of the order of applying the redo operations. This differential logging scheme may be applied to both a main-memory DBMS where the database is primarily stored in main memory and a disk-resident DBMS where the database is primarily stored in disks.

Figure 7A:
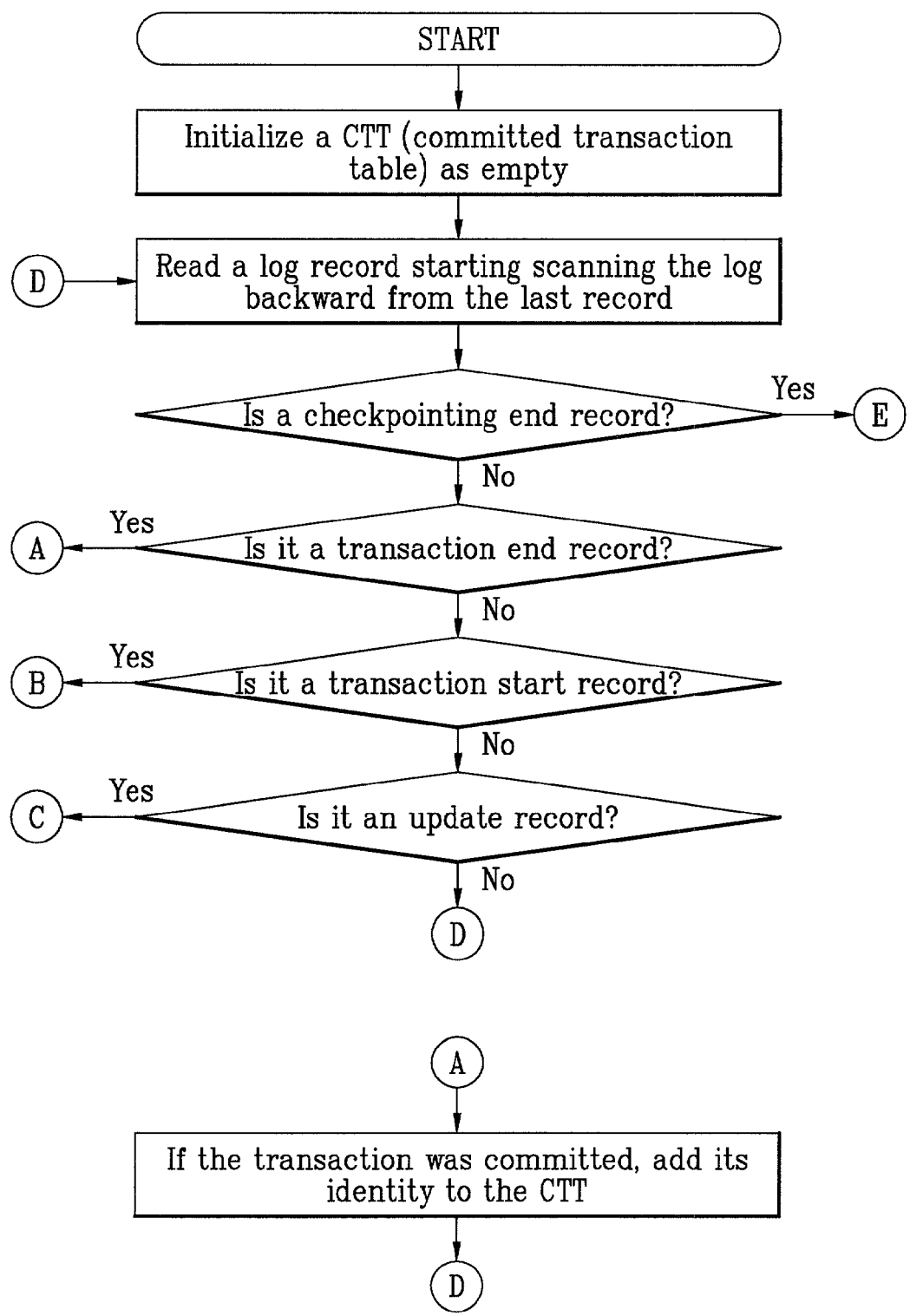

FIGS. 7a and 7b is a flow charts of a one-pass log-play process used in the present invention to recover the database from a backup made using a consistent checkpointing scheme. There are two categories of consistent checkpointing schemes: transaction consistent and action consistent. "Transaction consistent" means that no update transaction is in progress during checkpointing. In other words, a transaction-consistent checkpointing process can start only after all the on-going update transactions are completed, and no update transaction can start until the checkpointing process completes. "Action consistent" means that no update action is in progress during the checkpointing process. When using a consistent checkpointing scheme, the two-pass log-play process of FIGS. 3a and 3b can be used directly with the differential logging scheme of the present invention.

One benefit of the present invention is to make it possible to complete the log-play process by scanning the log only once. In the one-pass log-play process of the present invention, the log records are scanned in the opposite direction to the log record creation sequence, i.e., from the end of the log. When scanning the log backward, a transaction end log record is encountered before any other log records of the transaction. When an aborted transaction is encountered, there is no need to play the records of the transaction. In other words, once the committed transactions are identified, only the records of the committed transaction can be played, skipping the records of the aborted transactions.

Since nothing needs to be done for a loser transaction, it is treated as the same as an aborted transaction. As mentioned above, in the conventional methods, redo operations must be performed for all the transactions in the sequence of log record creation. Redo operations may be skipped for a loser transaction, but since one cannot determine whether a transaction is a loser transaction or not in advance, redo operations are done even for those would-be loser transactions. Therefore, undo operations are needed for those loser transactions after they are identified.

Figure 8A:
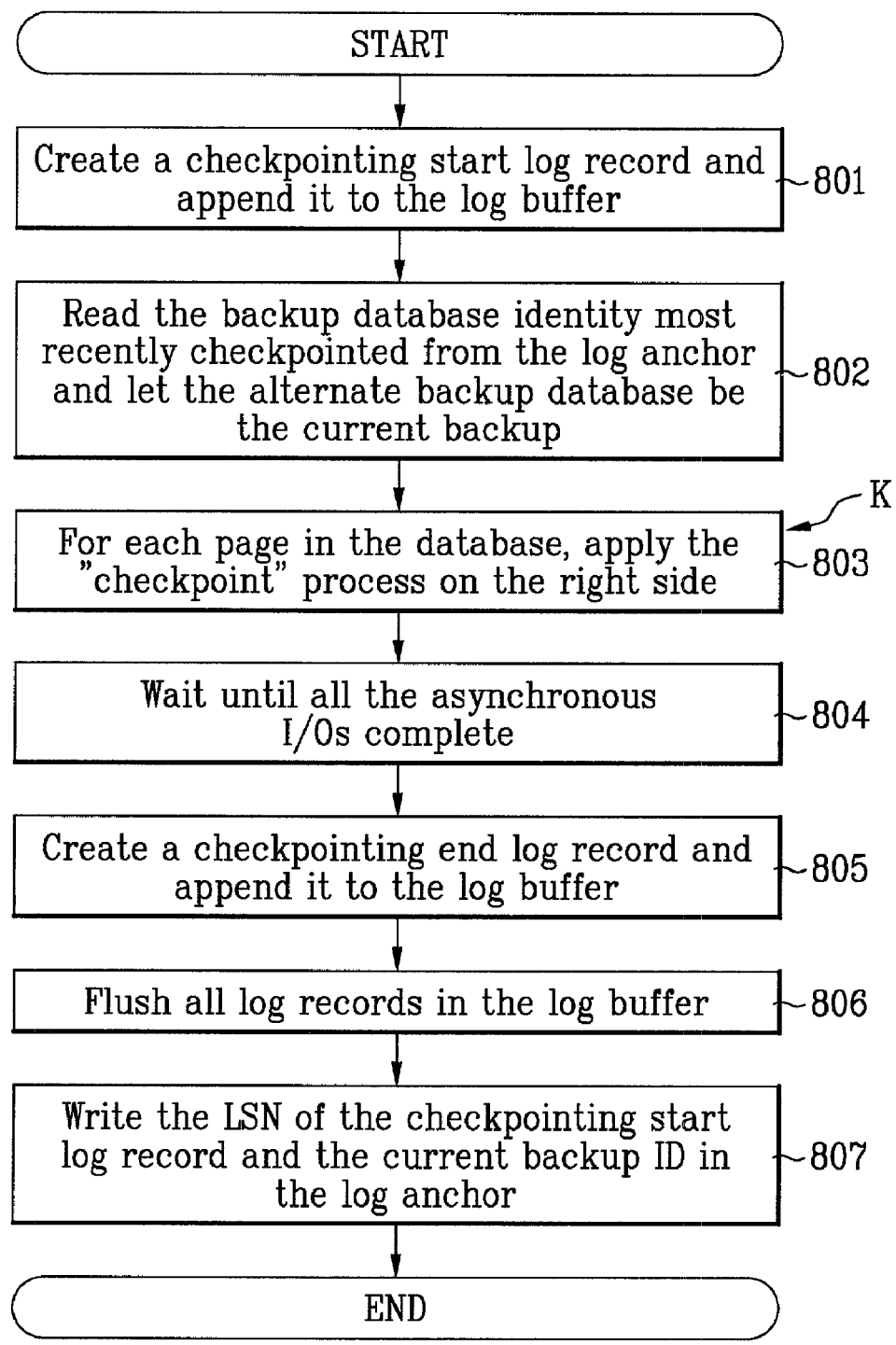
FIGS. 8a and 8b are flow charts of a fuzzy checkpointing process used in the present invention to make a backup without blocking other transactions.
Figure 8B:
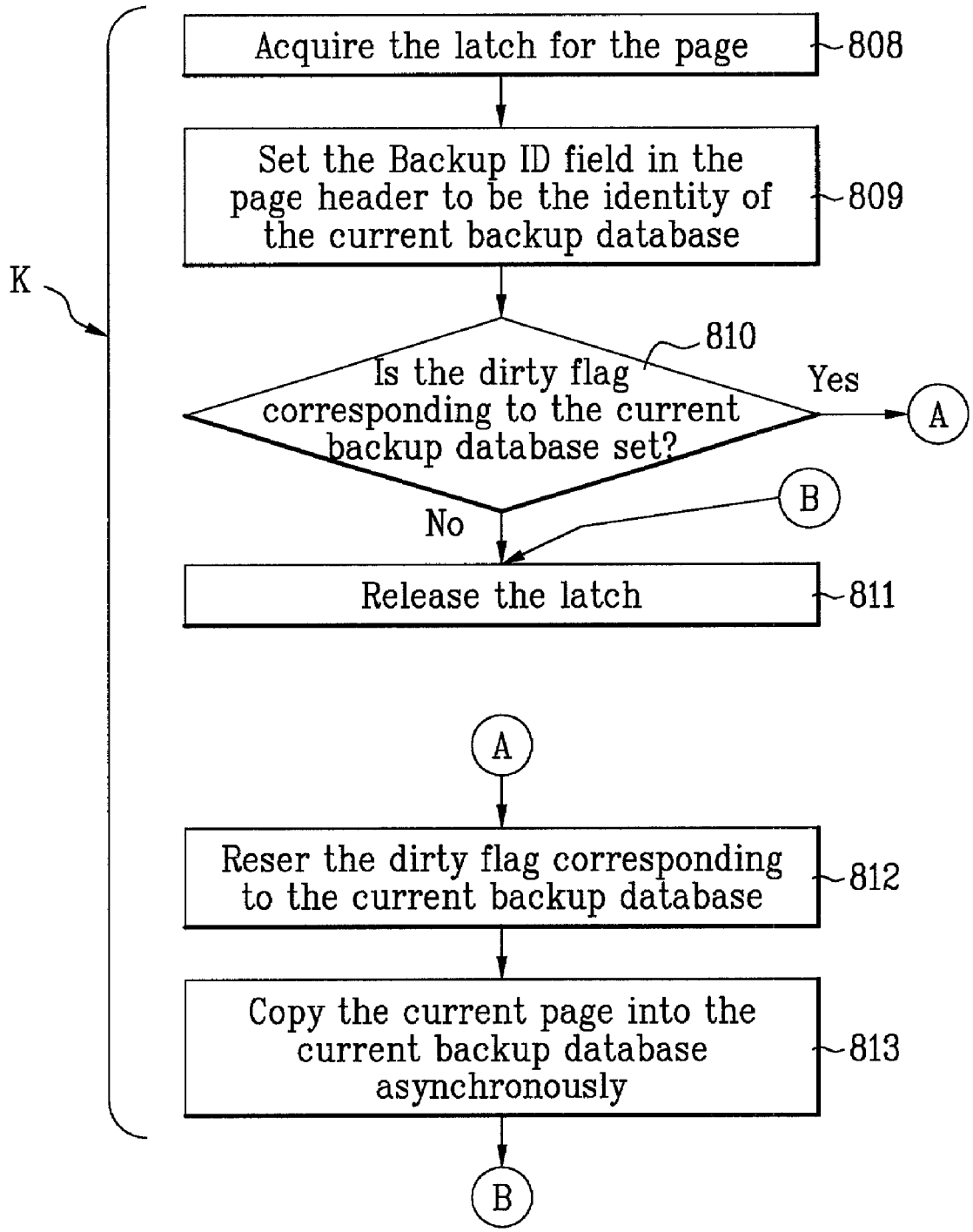

FIGS. 8a and 8b is a flow charts of a fuzzy checkpointing process used in the present invention to make a backup without blocking other transactions. "Fuzzy checkpointing" means that an update transaction and the checkpointing process may proceed in parallel. Fuzzy checkpointing is often preferred to consistent checkpointing because it allows other transactions to proceed during the checkpointing period.

When using fuzzy checkpointing together with the differential logging scheme of the present invention, two synchronization problems must be dealt with for correct recovery of the database. First, although an update transaction and a checkpointing process may occur in parallel as long as the two apply to different pages, a database page should not be backed up during checkpointing while the same page is being updated by a transaction. Otherwise, a mixture of both the before and the after images are copied, making it difficult to correctly recover from a crash. To handle the first problem, the present invention provides a synchronization mechanism so that the process of backing up a page and the process of updating a page occur in a locked state (as an atomic unit) (808 and 811).

Second, a mechanism is needed to determine whether a backed-up page reflects the database after a log record creation or before a log record creation. If the backup was made after a log record creation, there is no need to play the log record because the log record already reflects the changes. Since the present invention uses XOR for redo and undo operations, a mechanism is necessary to determine whether to play a log record or not. To deal with the second problem, the present invention maintains a field storing the most recent backup identifier in each page (809) and copies it into log records.

FIG. 9 is a flow chart of an update process used in the present invention in combination with the fuzzy checkpointing process of FIGS. 8a and 8b. To handle the two above-mentioned synchronization problems, a page is updated in a locked state (901 and 907), and the backup ID stored in a page is copied into an update log record (903). In order to update a page, the latch for the page is first acquired to enter into a locked state (901). Then, an update log record is created before updating (902), and the backup ID in the page header is copied into the log record (903). Then, the page is updated (904), and all the dirty flags in the page header are set (905). As mentioned above, there are two dirty flags: one for each of the two backups. Finally, the log record is appended to the log buffer (906), and the latch is released (907).

Figure 3A:
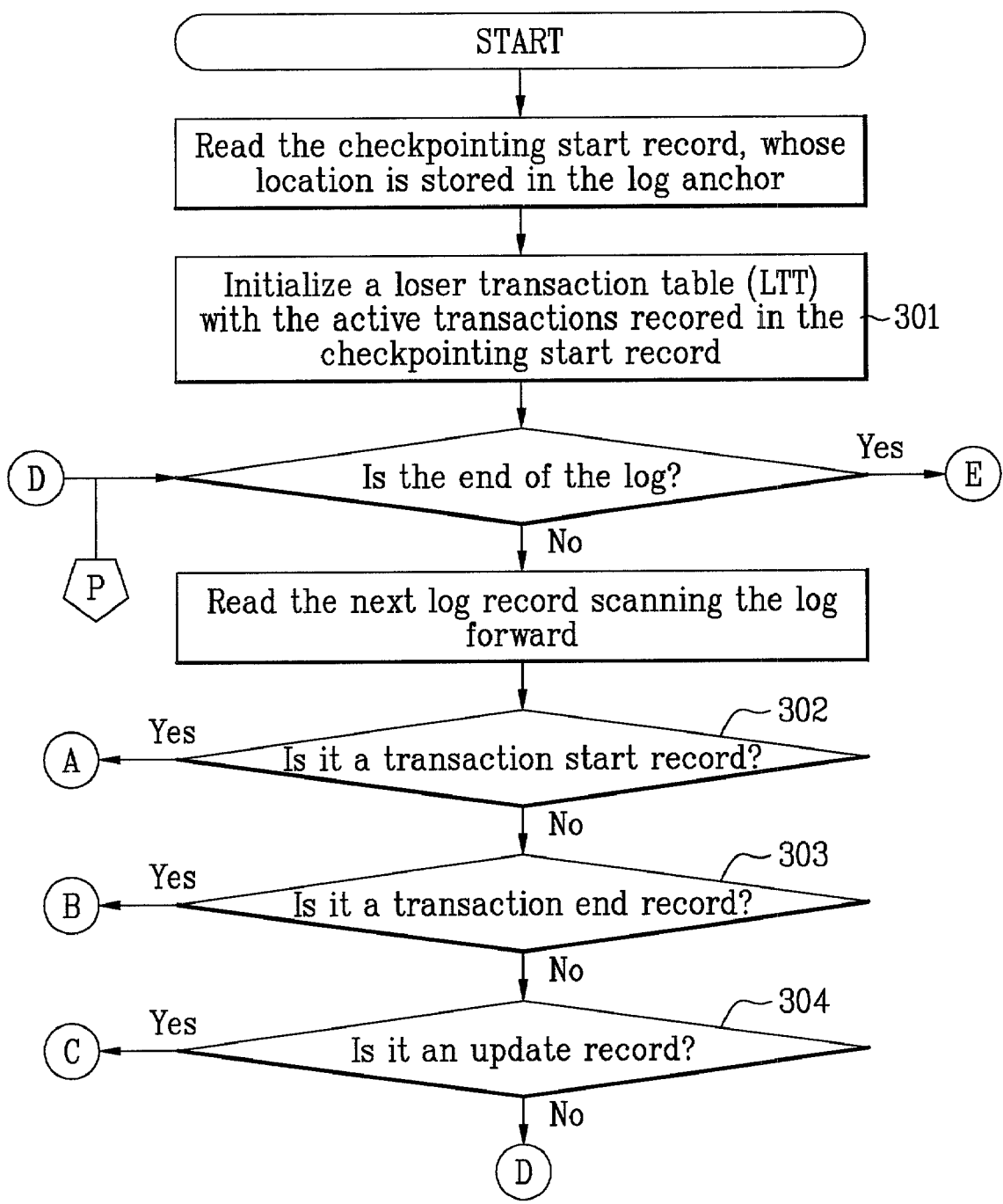
FIGS. 3a and 3b are flow charts of a two-pass log-play process used in the conventional recovery architecture during a restart process.
Figure 3B:
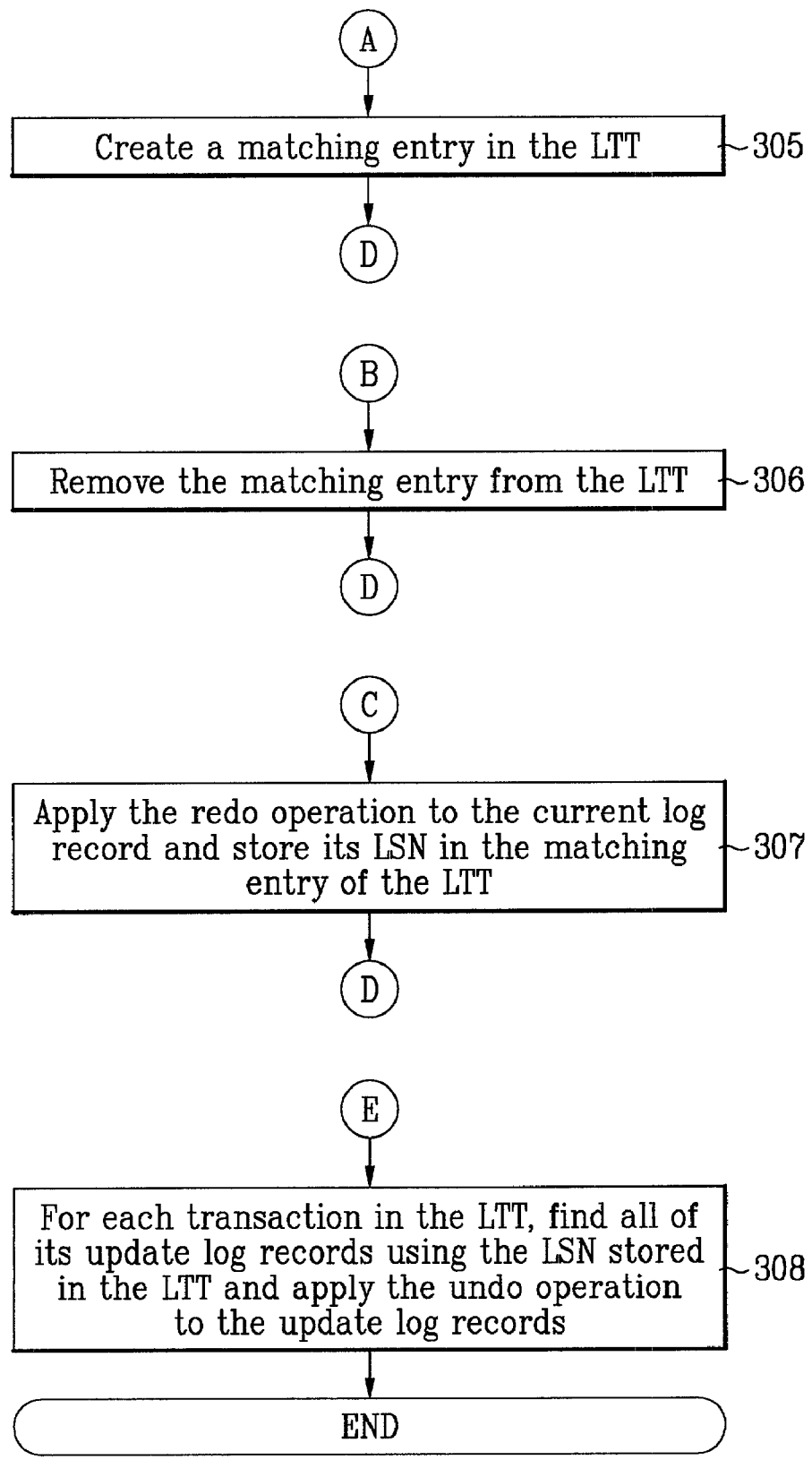
Figure 10B:
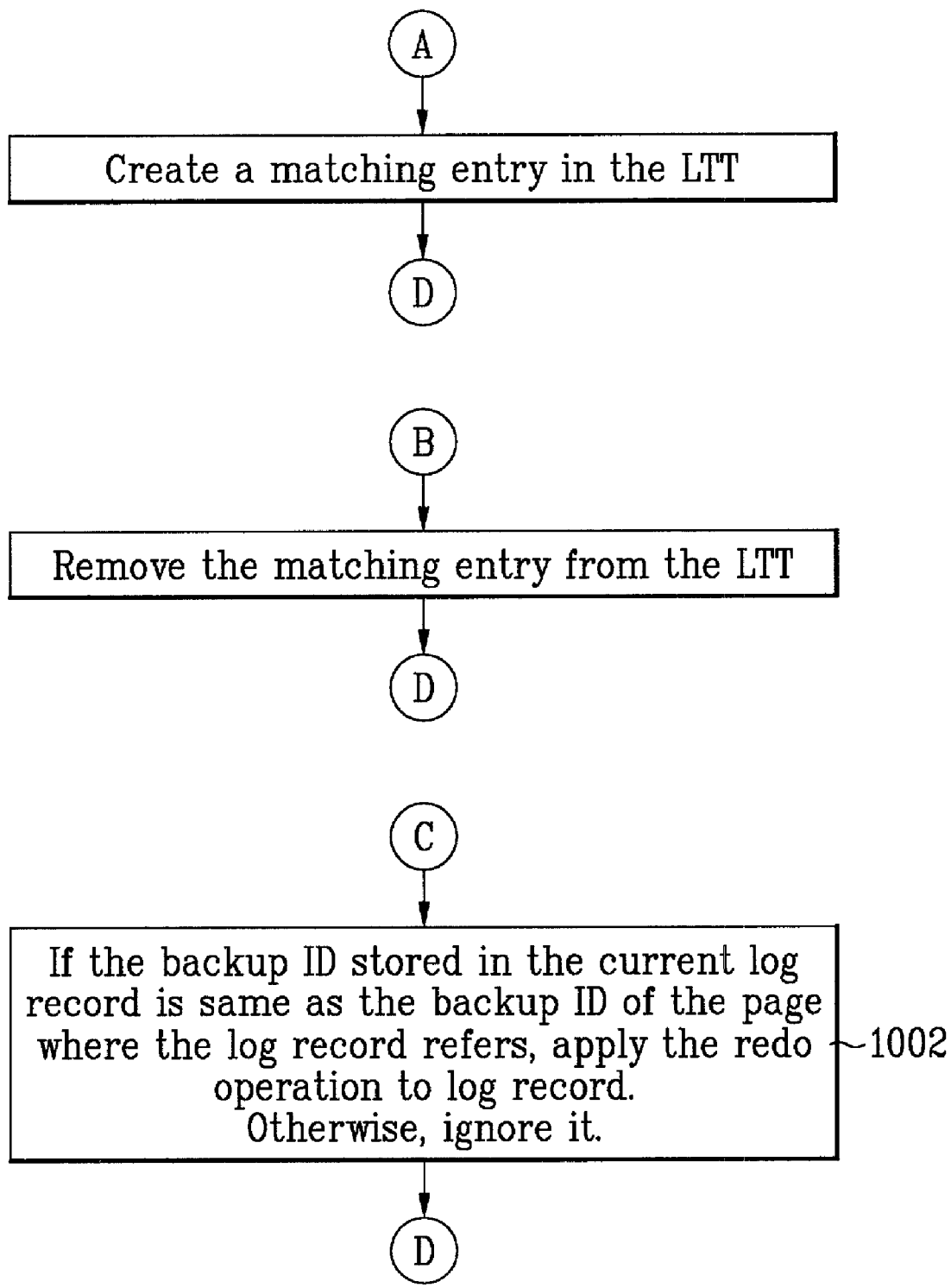

FIGS. 10a and 10b is a flow charts of a modified two-pass log-play process used in the present invention to recover the database from a backup made by the fuzzy checkpointing process. The difference from the two-pass log-play process of FIGS. 3a and 3b is that a special action is taken for update log records located between a checkpointing start record and the matching checkpointing end record. For such a log record, the backup ID in the record is compared to the backup ID stored in the page to which the log record refers. If the two IDs are same (1002), it indicates that the log record was created after the page was backed up. Since the page does not reflect the change by the log record, the log records needs to be played. But, if two IDs are different, it indicates that the log record was created before the page was backed up. Since the page already has the change corresponding to the log record, there is no need to play the log record. After encountering the checkpointing end record, the same steps as FIGS. 3a and 3b are taken (1001).

Figure 11A:
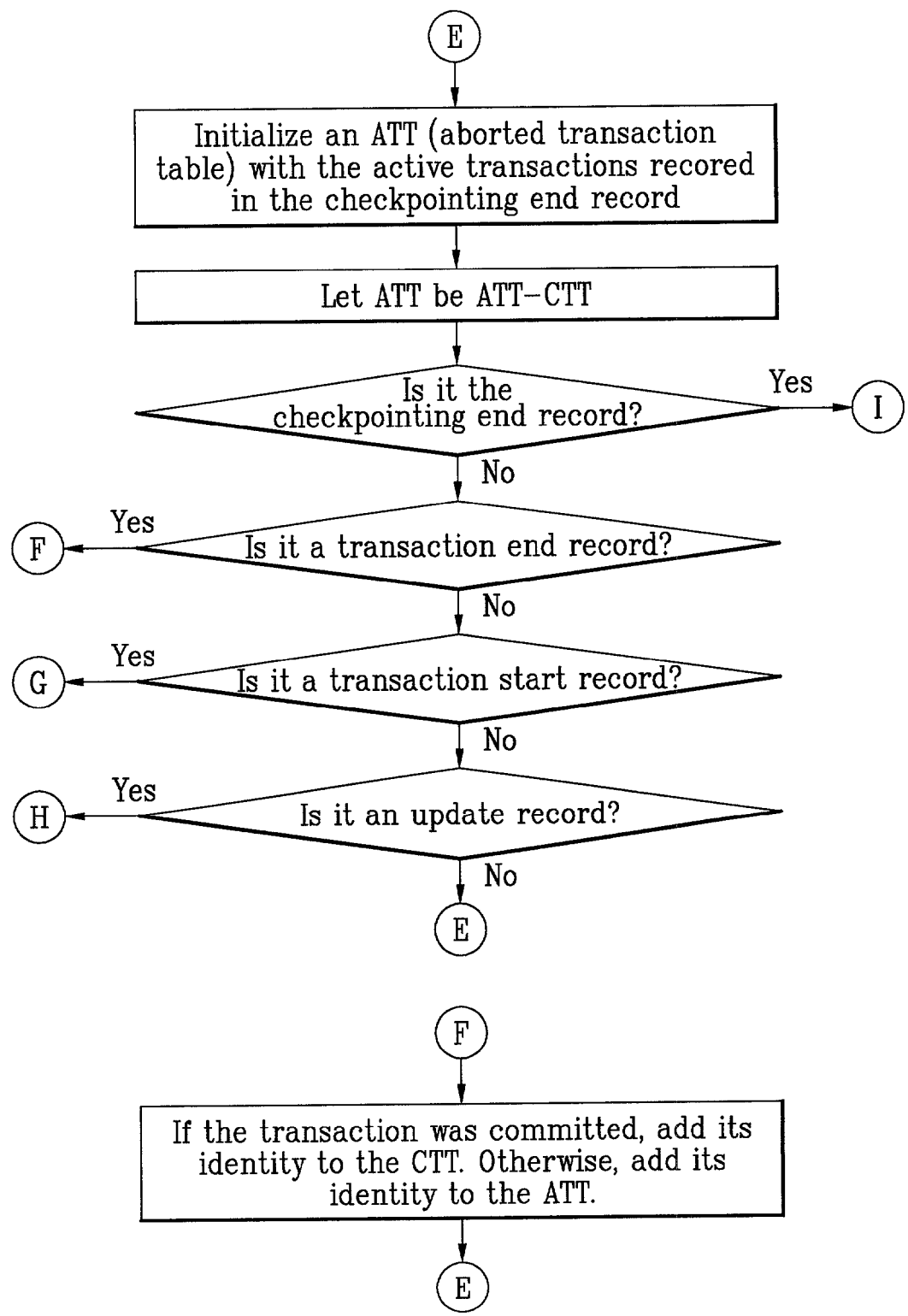
FIGS. 11a and 11b are flow charts of a modified one-pass log-play process used in the present invention to recover the database from a backup made by the fuzzy checkpointing process.
Figure 11B:
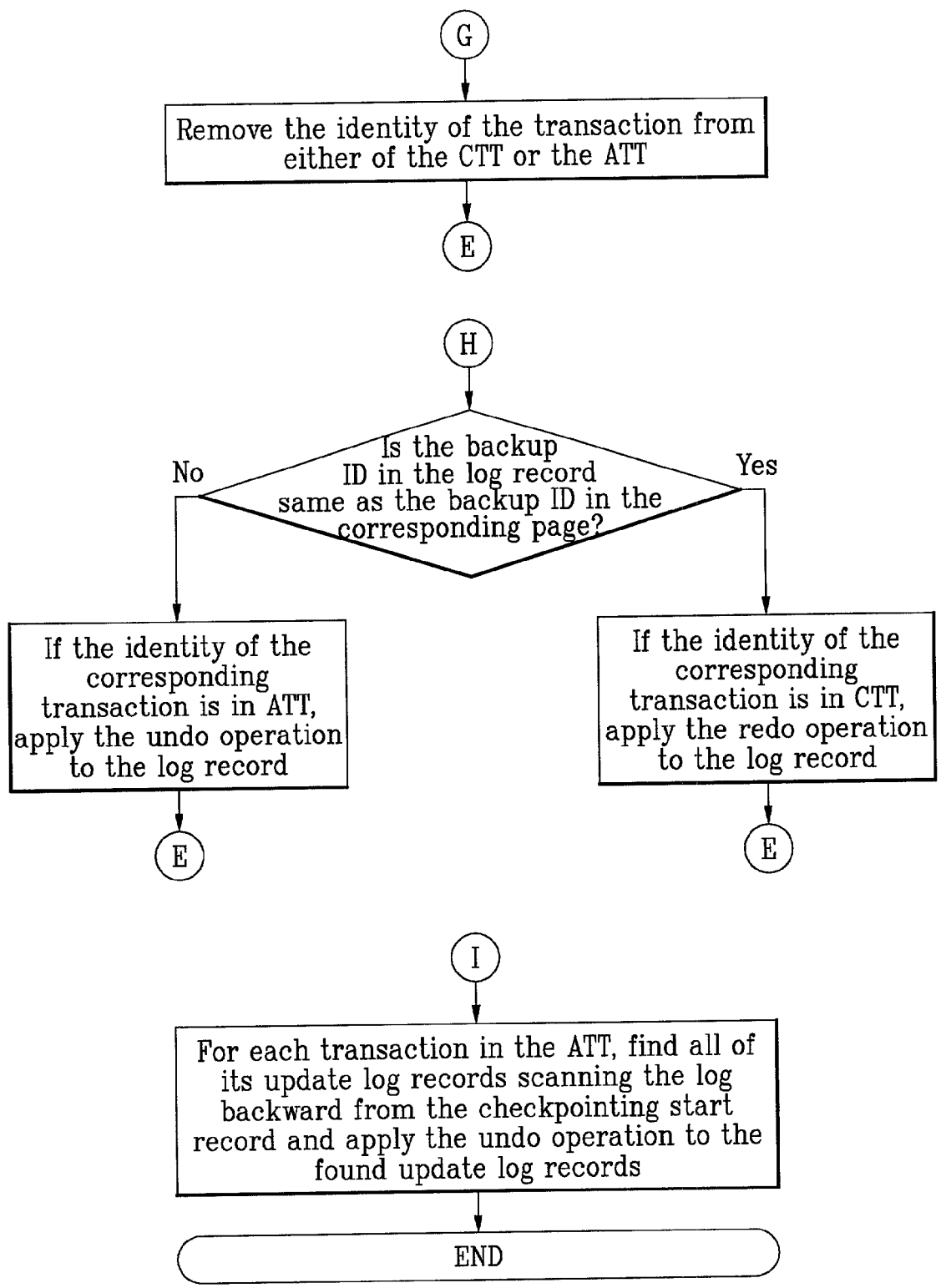

FIGS. 11a and 11b is a flow chart of a modified one-pass log-play process used in the present invention to recover the database from a backup made by the fuzzy checkpointing process. The difference from the one-pass log-play process of FIG. 7 is that a special action is taken for update log records located between a checkpointing end record and the matching checkpointing start record. For such a log record, the backup ID in the record is compared to the backup ID stored in the page to which the log record refers. If the two IDs are same and the corresponding transaction was committed, the record should be played to redo the change by the record. If the two IDs are different and the corresponding transaction was aborted, the record should be played to undo the change by the record. Otherwise, the record is just skipped.

Figure 12:
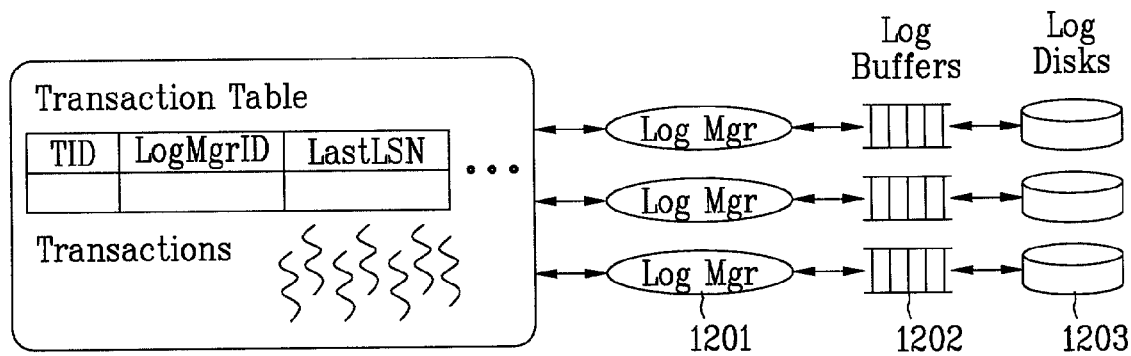
FIG. 12 a diagram of one embodiment of a logging architecture of the present invention where multiple persistent log storage devices are used to distribute log records and to enable parallel logging.

FIG. 12 shows an embodiment of a logging architecture of the present invention where multiple persistent log storage devices are used to distribute log records and to enable parallel logging. Unlike the physical logging scheme, the differential logging scheme allows us to freely distribute log records to multiple disks to improve the logging performance because the commutativity and associativity of XOR used in the differential logging scheme enables processing of log records in an arbitrary order. In this embodiment, log records are distributed to multiple persistent log storage devices based on transaction identifiers (TIDs). There is a different log manager (1201) for each persistent log storage device (1203). When a transaction starts, the identity of the log manager (LogMgr ID) having the least amount of load is assigned to the transaction so that the log records generated by the transaction are always stored in the persistent log storage device.

Figure 2:
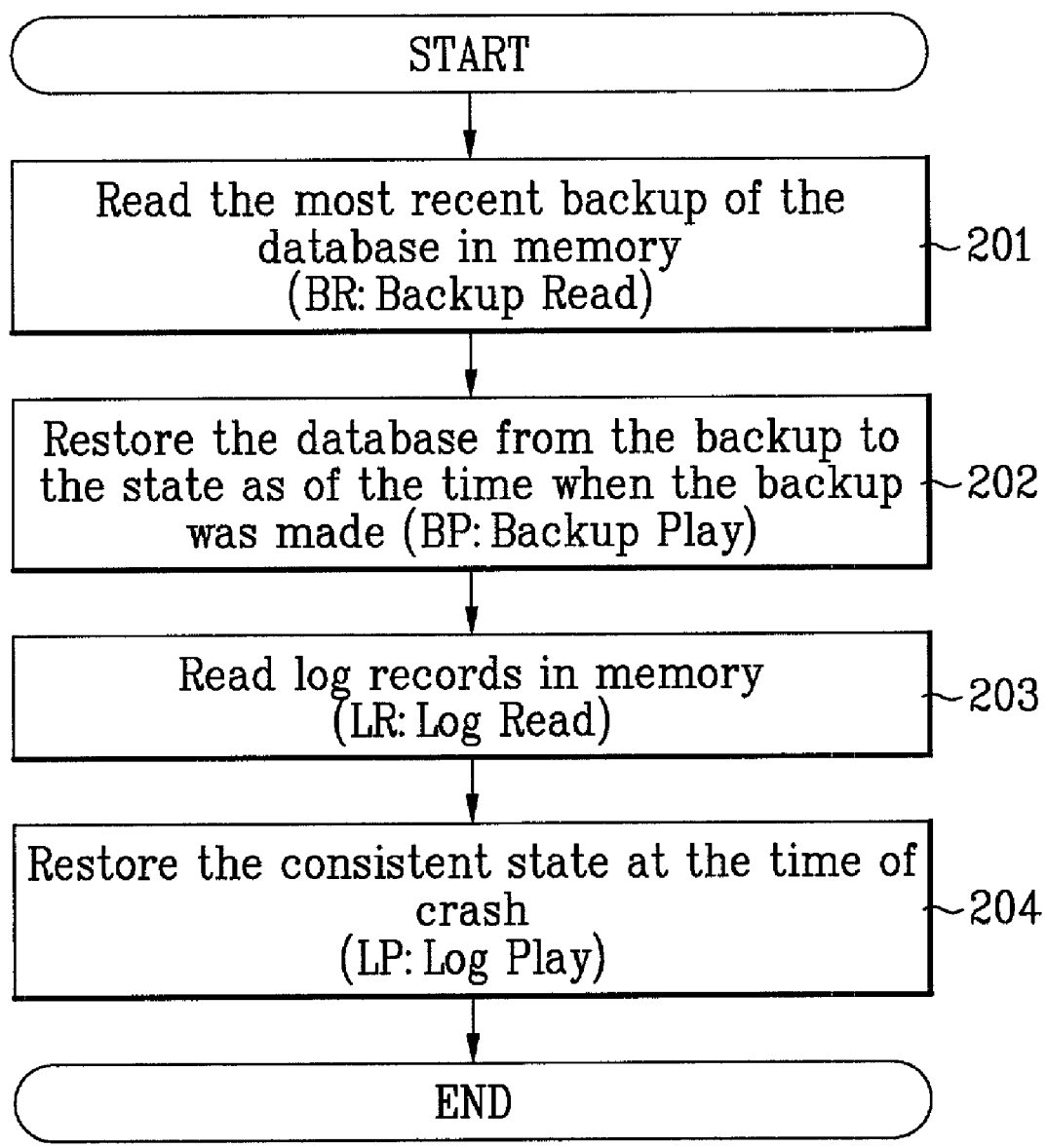
FIG. 2 is a flow chart of a restart process used in the conventional recovery architecture in the case of system crash.
Figure 13:
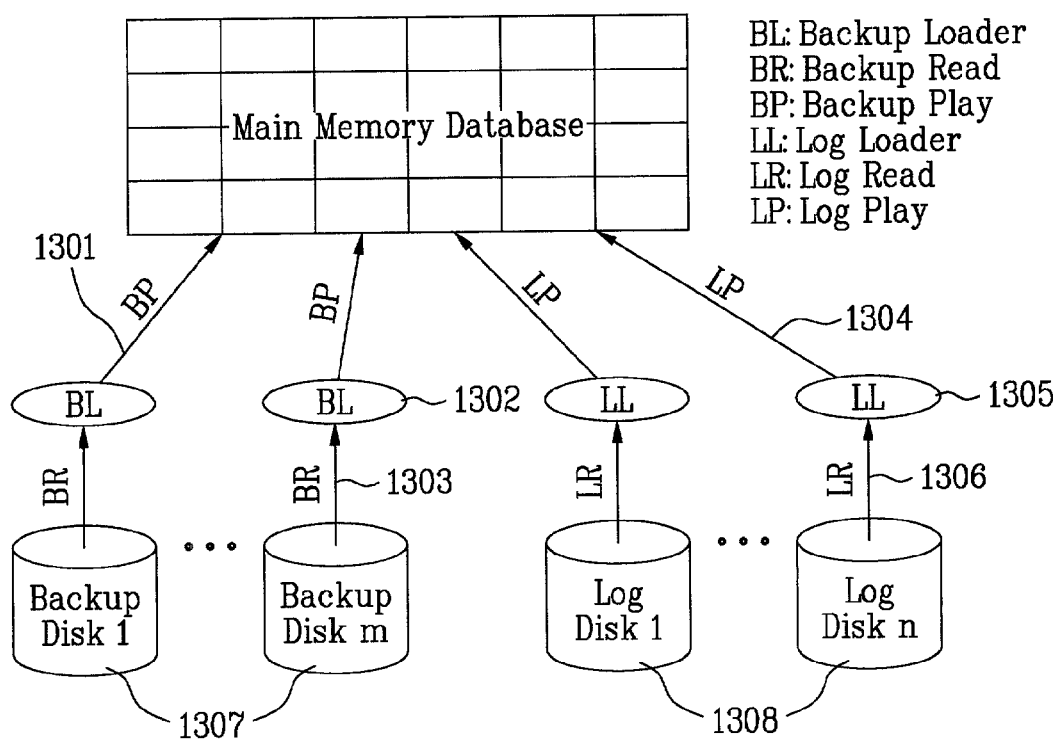
FIG. 13 is a diagram of one embodiment of a restart architecture of the present invention where multiple persistent log storage devices and persistent backup storage devices are used to enable parallel restarting.

FIG. 13 shows an embodiment of a restart architecture of the present invention where multiple persistent log storage device and persistent backup storage devices are used to enable parallel restarting. As mentioned in FIG. 2, the restart process comprises the four sub-processes, BR, BP, LR, and LP. In this embodiment, three types of parallelism are utilized to speed up the restart process. First, a different backup loader (BL) (1302) is instantiated for each persistent backup storage device (1307), and it performs the BR process (1302) and the BP process (1301) in a pipeline manner. Each BL runs independently of other BLs. Second, a different log loader (LL) (1305) is instantiated for each persistent log storage device (1308), and it performs the LR process (1306) and the LP process (1304) in a pipeline manner. Each LL runs independently of other LLs. Third, even BLs and LLs are run concurrently.

Figure 14:
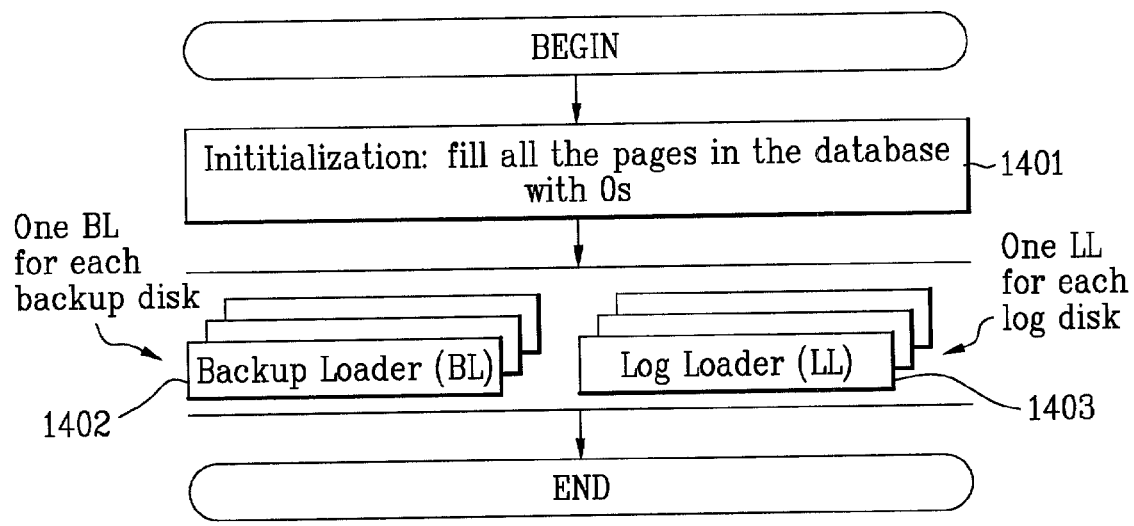
FIG. 14 is a flow chart of a fully parallel restart process used in the present invention to recover the database as quickly as possible using multiple persistent log storage devices and persistent backup storage devices.

FIG. 14 is a flow chart of a fully parallel restart process used in the present invention to recover the database as quickly as possible using multiple persistent log storage device and persistent backup storage device. First, all the pages in the database are filled with 0s (1401). Since 0 is the identity of the XOR operation, this allows the BP process to use the XOR operation to restore a page in the database instead of copying a page into the database. Second, one BL module and one LL module are created for each persistent backup storage device and persistent log storage device (1402 and 1403), respectively. They run independently and in parallel.

Figure 15:
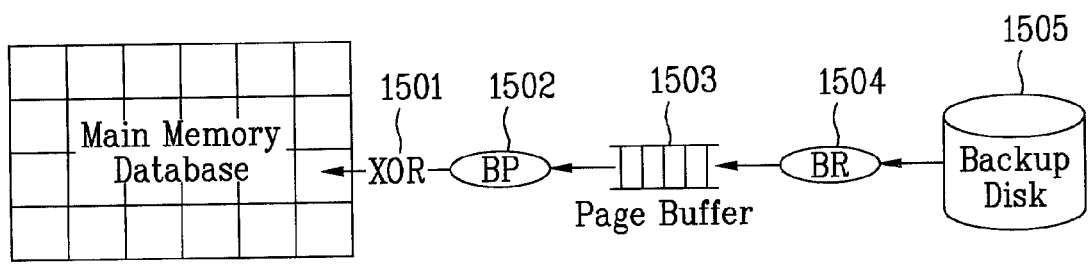
FIG. 15 is a diagram of one embodiment of the backup loader (BL) module used in the fully parallel restart process of the present invention.

FIG. 15 is a diagram of one embodiment of the backup loader (BL) module used in the fully parallel restart process of the present invention. The BL runs the BR process (1504) and the BP process (1502) in a pipeline manner or in the producer/consumer way. The BR process reads the persistent backup storage device (1505) page by page and appends each page to the page buffer (1503), which is used like a pipeline. The BP process takes a page from the buffer and applies it to the matching page in the database (1501). A novel aspect of the present invention is that the BP process uses the XOR operation when applying a backed-up page to the database. This allows us to run BLs and LLs concurrently, which was not possible in the conventional art.

Figure 16:
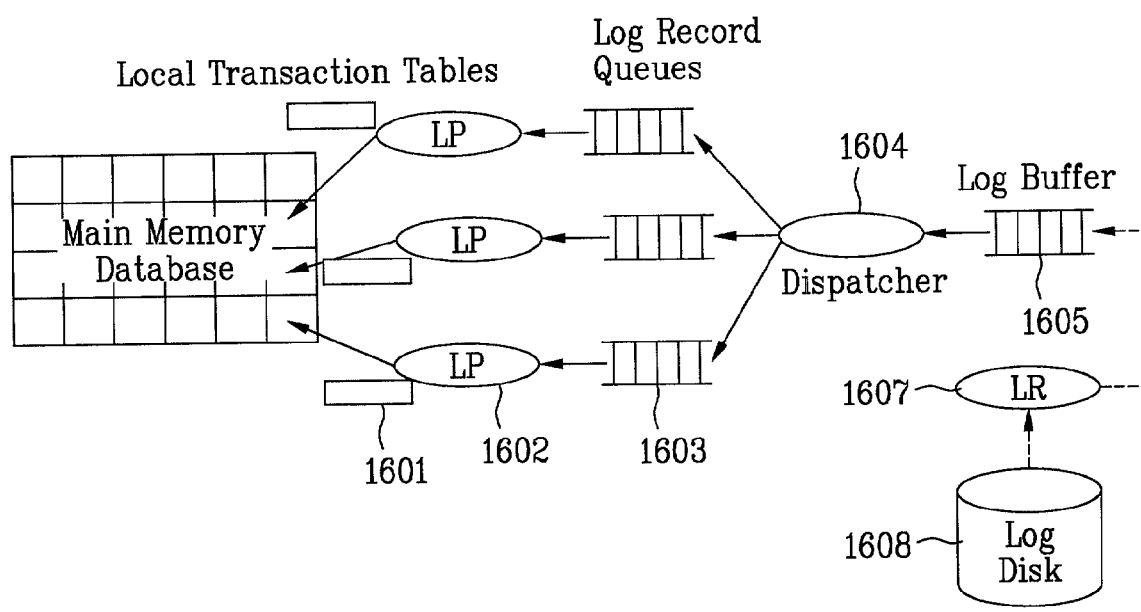
FIG. 16 is a diagram of one embodiment of the log loader (LL) module used in the fully parallel restart process of the present invention when a disk can transfer log records faster than a single CPU can handle.

FIG. 16 is a diagram of one embodiment of the log loader (LL) module used in the fully parallel restart process of the present invention when a disk can transfer log records faster than a single CPU can handle. In this embodiment, multiple LP processes (1601) are executed concurrently to utilize multiple CPUs. In addition to the LR and LP processes, the LL module uses another process (1604) to dispatch log records to multiple LP processes such that all the log records of a transaction are assigned to the same LP process. Then, each LP process can maintain transaction tables (1601) such as the LTT used in a two-pass log-play process and the CTT and the ATT used in a one-pass log-play process locally.

Figure 17:
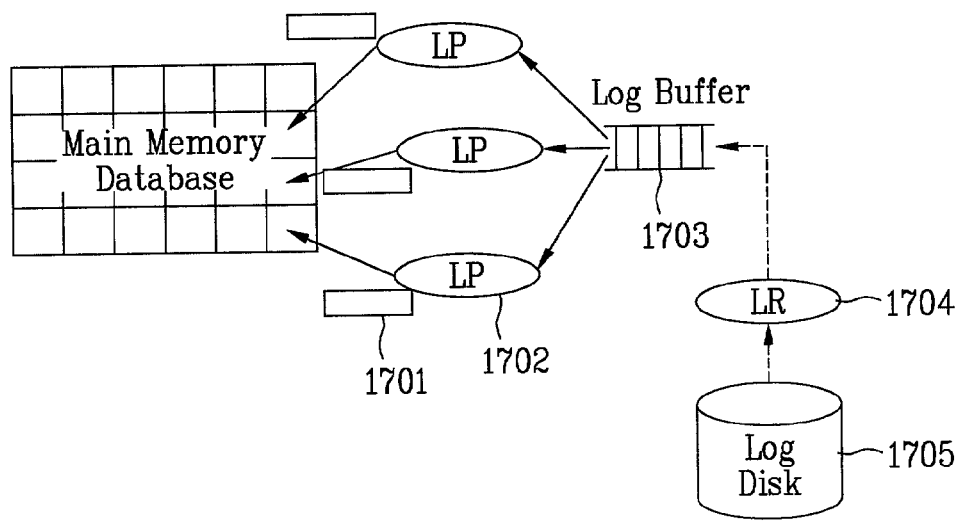
FIG. 17 is a diagram of another embodiment of the LL module used in the fully parallel restart process of the present invention when a disk can transfer log records faster than a single CPU can handle.

FIG. 17 is a diagram of another embodiment of the LL module used in the fully parallel restart process of the present invention when a disk can transfer log records faster than a single CPU can handle. In the previous embodiment of FIG. 16, the dispatcher process (1604) can be a bottleneck as the number of concurrent LP processes increases. Another problem is the overhead of acquiring and releasing locks for log record queues (1603) to use them concurrently. To deal with these problems, LP processes (1702) access the log buffer (1703) directly in the current embodiment and partition log records based on their transaction identifiers. A simple scheme is to use the modulo operation. For example, when there are three LP processes, the first process takes the log records with the transaction identifiers that have the remainder of 0 when divided by 3.

In this embodiment, each log buffer page has a counter. This counter is reset when the LR process (1704) fills it with the data read from the persistent log storage device (1705). When an LP process finishes scanning a buffer page, it increment the counter of the page in a locked state. Then, when the counter has the same value as the number of LP processes, the buffer can be flushed.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

The invention claimed is:

1. A method of logging and recovery in a transaction-processing system having a main memory for storing a database, wherein the database comprises a plurality of objects, any of which is denoted by b hereafter, one or more persistent backup storage devices for storing a copy of the database in the main memory, and one or more persistent log storage devices for storing log records, the logging method comprising:
generating a differential log record using $\Delta_t = b_{t-1} \oplus b_t$ where $\Delta_t$ is the differential log record generated for the t-th update on a database object b, $\oplus$ is the bit-wise exclusive-OR (XOR) operation, $b_{t-1}$ is the image of the database before the t-th update occurs, and $b_t$ is the image of the database after the t-th update occurs; and the recovery method comprising:
redoing updates of committed transactions using $b_{s+p} = b_s \oplus \Delta_{(1)} \oplus \Delta_{(2)} \ldots \oplus \Delta_{(p)}$, where $b_s$ is the image of a database object b after s number of updates are reflected, $b_{s+p}$ is the image of b rolled forward from $b_s$ by p number of updates involved in committed transactions, $\oplus$ is the bit-wise XOR operation, and where the sequence of the differential log records applied, $\Delta_{(1)}$ through $\Delta_{(p)}$, is any possible arrangement of the set of sequentially-generated differential log records $\{\Delta_{s-1}, \ldots, \Delta_{s+p+1}, \Delta_{s+p}\}$ in the order independent from the order of log creation, and undoing updates of uncommitted transactions using $b_{s-q} = b_s \oplus \Delta_{(1)} \oplus \Delta_{(2)} \ldots \oplus \Delta_{(q)}$, where $b_s$ is the image of a database object b after s number of updates are reflected, $b_{s-q}$ is the image of b rolled backward from $b_s$ by q number of updates involved in uncommitted transactions, $\oplus$ is the bit-wise XOR operation, and where the sequence of the differential log records applied, $\Delta_{(1)}$ through $\Delta_{(q)}$, is any possible arrangement of the set of sequentially-generated differential log records $\{\Delta_{s-q+1}, \Delta_{s-q+2}, \ldots, \Delta_s\}$ in the order independent from the order of log creation.

2. The method of claim 1, wherein the database comprises a plurality of fixed-size pages.

3. The method of claim 2, wherein said each log record has a log header comprising:
LSN (Log Sequence Number) for storing a log sequence;
TID(Transaction ID) for storing the identity of the transaction that created the log record;
Previous LSN for storing the identity of the most recently created log by the same transaction;
Type for storing the type of the log record;
Backup ID for storing the relation between the log record and the updated page for use with fuzzy checkpointing;
Page ID for storing the identity of an updated page;
Offset for storing the starting offset of an updated area within the updated page; and
Size for storing the size of the updated area.

4. The method of claim 1, further comprising:
checkpointing by occasionally writing the database in the main memory to said one or more persistent back storage devices.

5. The method of claim 4, wherein checkpointing uses a transaction consistent checkpointing policy.

6. The method of claim 4, wherein checkpointing uses an action consistent checkpointing policy.

7. The method of claim 4, wherein checkpointing uses a fuzzy checkpointing policy.

8. The method of claim 4, wherein the recovery method further comprises:
loading the checkpointed database from said one or more persistent backup storage devices into the main memory database; and
loading the log records from said one or more persistent log storage devices into the main memory database in order to restore the main memory database to the most recent consistent state.

9. The method of claim 8, wherein loading the checkpointed database is executed in parallel by partitioning data in said one or more backup storage devices.

10. The method of claim 8, wherein the recovery method is done in two passes by separating a redoing pass and an undoing pass.

11. The method of claim 10, wherein reading the log records and redoing/undoing the log records are executed in a pipeline.

12. The method of claim 10, wherein reading the log records is executed in parallel by partitioning the log records as well as redoing/undoing the log records.

13. The method of claim 12, wherein reading the log records and redoing/undoing the log records are executed in a pipeline.

14. The method of claim 8, wherein redoing/undoing the log records is done in one pass.

15. The method of claim 14, wherein reading the log records and redoing/undoing the log records are executed in a pipeline.

16. The method of claim 14, wherein reading the log records and redoing/undoing the log records are executed in parallel by partitioning the log records.

17. The method of claim 16, wherein reading the log records and redoing/undoing the log records are executed in a pipeline.

18. The method of claim 8, further comprising filling the main memory database with 0s in advance.

19. The method of claim 18, wherein loading the checkpointed database comprises:
reading the checkpointed database from said one or more backup storage devices; and
redoing/undoing the checkpointed database by applying the XOR operation between the checkpointed database and the main memory database.

20. The method of claim 19, wherein reading the checkpointed database and redoing/undoing the checkpointed database are executed in a pipeline.

21. The method of claim 19, wherein loading the checkpointed database is executed in parallel by partitioning the checkpointed database as well as redoing/undoing the checkpointed database.

22. The method of claim 21, wherein reading the checkpointed database and redoing/undoing the checkpointed database are executed in a pipeline.

23. The method of claim 19, wherein loading the checkpointed database and loading the log records are executed in parallel.

24. A transaction processing system allowing logging updates and recovering from failure, comprising:
a main memory for storing a database;
one or more persistent log storage devices for storing log records;
one or more persistent backup storage devices for storing a copy of the database in the main memory;
means for generating a differential log record using $\Delta_t = b_{t-1} \oplus b_t$ where $\Delta_t$ is the differential log record generated for the t-th update on a database object b, $b_{t-1}$ is the before-update image and $b_t$ is the after-update image, and $\oplus$ is the bit-wise XOR operation; and
means for replaying the differential log records in an arbitrary order, independent of their generation order, by using the bit-wise XOR operations,
wherein said means for replaying further comprises:
means for redoing committed transactions using $b_{s+p} = b_s \oplus \Delta_{(1)} \oplus \Delta_{(2)} \ldots \oplus \Delta_{(p)}$, wherein $b_s$ is the image of a database object b after s number of updates are reflected, $b_{s+p}$ is the image of b rolled forward from $b_s$ by p number of updates involved in committed transactions, and $\oplus$ is the bit-wise XOR operation, where the sequence of the differential log records applied, $\Delta_{(1)}$ through $\Delta_{(p)}$, is any possible arrangement of the set of sequentially-generated differential log records $\{\Delta_{s+1}, \ldots, \Delta_{s+p-1}, \Delta_{s+p}\}$ in the order independent from the order of log creation; and
means for undoing uncommitted transactions using $b_{s-q} = b_s \oplus \Delta_{(1)} \oplus \Delta_{(2)} \ldots \oplus \Delta_{(q)}$, wherein $b_s$ is the image of a database object b after s number of updates are reflected, $b_{s-q}$ is the image of b rolled backward from $b_s$ by q number of updates involved in uncommitted transactions, and $\oplus$ is the bit-wise XOR operation, where the sequence of the differential log records applied, $\Delta_{(1)}$ through $\Delta_{(q)}$, is any possible arrangement of the set of sequentially-generated differential log records $\{\Delta_{s-q+1}, \Delta_{s-q+2}, \ldots, \Delta_s\}$ in the order independent from the order of log creation.

25. The system of claim 24, wherein the database comprises a plurality of fixed-size pages.

26. The system of claim 24, further comprising:
means for checkpointing the database by occasionally writing the database in the main memory to one or more persistent backup storage devices.

27. The system of claim 26, wherein the means for checkpointing uses a transaction consistent checkpointing policy.

28. The system of claim 26, wherein the means for checkpointing uses an action consistent checkpointing policy.

29. The system of claim 26, wherein the means for checkpointing uses a fuzzy checkpointing policy.

30. The system of claim 26, wherein the means for replaying comprises:
means for loading the checkpointed database into the main memory database; and
means for loading the log into the main memory database.

31. The system of claim 30, wherein the means for loading the checkpointed database comprises:
means for reading the checkpointed database from one or more persistent backup storage devices; and
means for playing the checkpointed database to restore the main memory database to the state when the backup was made by applying the XOR operations between the checkpointed database and the main memory database.

32. The system of claim 30, wherein the means for loading the log comprises:
means for reading the log records from the persistent log storage devices; and
means for playing the log records in two passes to restore the main memory database to the latest consistent state.

33. The system of claim 30, wherein the means for loading the log comprises:
- means for reading the log records from the persistent log storage devices; and
- means for playing the log records in one pass to restore the main memory database to the latest consistent state.

34. A computer-readable storage medium that contains a program for logging updates and recovering from failure in a transaction-processing system having a main memory for storing a database, one or more persistent backup storage devices for storing a copy of the database in the main memory, and one or more persistent log storage devices for storing log records, where the program under the control of a CPU performs:
- generating differential log records by using $\Delta_t = b_{t-1} \oplus b_t$, where $\Delta_t$ is the differential log record generated for the t-th update on a database object b, $b_{t-1}$ is the before-update image and $b_t$ is the after-update image, and $\oplus$ is the bit-wise XOR operation;
- replaying the differential log records in an arbitrary order, independent of their generation order, by using the bit-wise XOR operations,
- wherein replaying the differential log records further comprises:
- redoing committed transactions using $b_{s+p} = b_s \oplus \Delta_{(1)} \oplus \Delta_{(2)} \cdots \oplus \Delta_{(p)}$, wherein $b_s$ is the image of a database object b after s number of updates are reflected, $b_{s+p}$ is the image of b rolled forward from $b_s$ by p number of updates involved in committed transactions, and $\oplus$ is the bit-wise XOR operation, where the sequence of the differential log records applied, $\Delta_{(1)}$ through $\Delta_{(p)}$, is any possible arrangement of the set of sequentially-generated differential log records $\{\Delta_{s+1}, \ldots, \Delta_{s+p-1}, \Delta_{s+p}\}$ in the order independent from the order of log creation; and
- undoing uncommitted transactions using $b_{s-q} = b_s \oplus \Delta_{(1)} \oplus \Delta_{(2)} \cdots \oplus \Delta_{(q)}$, wherein $b_s$ is the image of a database object b after s number of updates are reflected, $b_{s-q}$ is the image of b rolled backward from $b_s$ by q number of updates involved in uncommitted transactions, and $\oplus$ is the bit-wise XOR operation, where the sequence of the differential log records applied, $\Delta_{(1)}$ through $\Delta_{(q)}$, is any possible arrangement of the set of sequentially-generated differential log records $\{\Delta_{s-q+1}, \Delta_{s-q+2}, \ldots, \Delta_s\}$ in the order independent from the order of log creation.

35. The storage medium of claim 34, wherein the medium is a CD.

36. The storage medium of claim 34, wherein the medium is a magnetic tape.

37. The method of claim 1, further comprising one or more in-memory log buffers wherein each generated log record is temporarily stored in any available log buffer and a group of the buffered log records are written together to an arbitrary one of said one or more persistent log storage devices.

* * * * *